Aug. 14, 1928.

W. SCHULTZE 1,680,807

CATALYST COMPACT AND PROCESS OF MAKING SAME

Filed Aug. 16, 1923

WITNESS

INVENTOR
WILLIAM SCHULTZE
BY
ATTORNEYS

Patented Aug. 14, 1928.

1,680,807

UNITED STATES PATENT OFFICE.

WILLIAM SCHULTZE, OF SYRACUSE, NEW YORK, ASSIGNOR TO ATMOSPHERIC NITROGEN CORPORATION, OF SOLVAY, NEW YORK, A CORPORATION OF NEW YORK.

CATALYST COMPACT AND PROCESS OF MAKING SAME.

Application filed August 16, 1923. Serial No. 657,817.

My invention relates to catalysts and particularly such as are used in that stage of the synthetic ammonia process (preferably the de Jahn process) wherein gas containing CO mixed with steam in regulated quantities is passed over a catalyst with the result that steam is decomposed and hydrogen liberated substantially to the extent that for each volume of carbon monoxide that is oxidized to one volume of carbon dioxide there will be simultaneously produced one volume of hydrogen. The general formula for the reaction is usually stated as $CO + H_2O = CO_2 + H_2$. The object of this invention is to provide a convenient, efficient and durable catalyst particularly adapted for use in the said stage of the said operation.

The leading characteristic of the new catalyst is that it is given the form and condition of tablets or compacts produced from a multiplicity of fine particles of catalytic material, not naturally coherent in the dry state but caused to remain in a relatively permanent condition of cohesion in a tablet by compression applied to a degree which assures the retaining of shape and of coherence during use, yet preserving a sufficient amount of porosity to obtain a powerful and long continued catalytic action.

Figure 1:
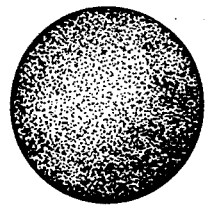
Figure 2:
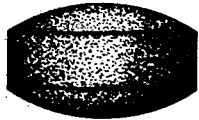

In the drawing I have illustrated one form of catalyst which constitutes the subject matter of this invention, Fig. 1 representing a top view and Fig. 2 an edge view, both views being enlarged, of one of the tablets constituting the catalytic substance of this application.

Catalysts of the type to which this invention relates have heretofore been used either in a loose or granular condition, or they have been shaped while in a wet condition and held together by the aid of a binder or of liquid ingredients. Each of these earlier forms of catalysts is defective in certain respects as will be explained below. I have now discovered that the drawbacks resulting from the form in which the catalytic material existed in the converters according to prior practice can be overcome by causing coherence of the catalytic bodies through pressure applied while the material is in a dry condition and that, if thus dealt with, a catalyst of very superior efficiency and durability may be obtained.

Contrary to what might be expected, this coherence, initially produced by pressure, is maintained by the catalyst particles under the high temperature, high gas velocities and chemical reactions existing and proceeding in the reaction vessel or converter and the relatively dense and compact form of the catalyst does not interfere with the activity of the catalyst particles. The preparation of the catalytic material may obviously follow any known or preferred methods. Some examples of specific procedure may, however, be advantageously set forth.

*First example.*—Iron in the form of nails or borings or both is dissolved in nitric acid. A typical proportion is 150 pounds of iron and 1235 pounds of nitric acid 40° Baumé. To the iron nitrate solution thus obtained I add a relatively small amount of potassium bichromate solution, for example, 26½ pounds of the bichromate and 340 pounds of water, the latter being used partly to dissolve the bichromate and partly to dilute the acid. There is then added gradually and in excess, ground solid magnesium carbonate (magnesite). Approximately 1260 pounds satisfy the requirements. The iron is precipitated by a part of the magnesite, which to that extent is to be regarded as a precipitant, and the precipitated iron is deposited on the excess magnesite, such excess magnesite forming a body or carrier for the deposited iron. The resulting product is a porous mud in which the water of the reaction liquid is contained. This product is then heated in a pan furnace gradually to about 200° to 300° C. to drive off water and a portion of the nitric acid and is thereupon ignited in a reverberatory furnace at a maximum temperature of about 700° C. until the evolution of fumes has substantially ceased. The product thus obtained is conceived of as a mixture of iron and magnesium oxides, and is a substance of hard or abrasive character accompanied by small amounts of potassium and chromium residues of the potassium bichromate. The dry product is crushed until it all passes through a 12 mesh screen and the thus crushed product is then compressed into coherent bodies or tablets. A press of the character known as the Stokes tablet machine is suitable for this molding or compacting operation, although, because of the abrasive and hard nature of the catalytic material to be tableted, this type of press should be strengthened with respect to the punches and die seats. The compacts, tablets or pills, as they might be termed, are preferably of the usual tablet form which comprises a cylindrical peripheral surface and two convex faces. This form of tablet is believed to be stronger and less likely to chip or disintegrate than tablets of either spherical or flat shapes. A tablet having the dimensions of about ⅜ of an inch in diameter and about ⅕ of an inch in thickness at the center and about ⅛ of an inch at the edge (volume about .019 cu. in. or .3 c. c.) and weighing about ½ of a gram, is a suitable size for the tablets produced in accordance with this invention. The degree of compacting may further be indicated by the fact that whereas a measured 100 c. c. of the material to be compressed weighs approximately 60–70 grams, depending on the average size of the granules, 100 c. c. of the material when tabletted and measured in the same manner will weigh about 100 grams, but the density of the tablets themselves is actually about 1.65. The degree of porosity of the tablets is indicated by the fact that 1 c. c. of tablet material will absorb about .45 c. c. of water. It will be observed that in the foregoing procedure all of the catalytic material produced is used in the tablets, be the same ground finely or relatively coarsely. Everything is passed through the 12 mesh screen and used. Heretofore such material has occasionally been screened after it was crushed and a certain fraction, for example, that passing through a 4 mesh and remaining upon a 16 mesh screen was the finished product. Not only did this involve a considerable waste as fines, (amounting in some cases to as much as 40% of the total iron) but the catalyst proved unsatisfactory under plant conditions because the particles or granules of the catalyst disintegrated in the converter to such an extent that within a short time the resistance to the gas flow was so great that it was necessary to shut down and screen the catalyst to remove the fines. A short time thereafter it was necessary to repeat the screening operation. All of these difficulties, losses and disadvantages are overcome by using the catalyst in tabletted form as above described.

*Second example.*—300 grams of iron nails are dissolved in slight excess of nitric acid. The resultant iron nitrate solution is then poured into 10 gallons of water to which 3 liters of 26 Baumé aqua ammonia has been previously added. This ammonia exercises a function similar to that of the reacting magnesium carbonate of the first example, that is to cause precipitation of iron hydroxide. This precipitate is allowed to settle out and is washed by decantation with water. It is then filtered, dried and ignited to 500° C. The ignited material, which at this stage is in the form of a coarse powder, is moistened with 10% of its weight of water, passed through a twenty mesh screen, dried at 100° C. and then, in this dry condition, compressed into coherent bodies or tablets as in the first example.

*Third example.*—In the two foregoing examples the iron hydroxide is obtained by the treatment of material such as iron nails. In the third example I take a raw material such as hematite which contains iron in the form of sesquioxide $Fe_2O_3$ and mix it with potassium hydroxide, water and magnesite. For instance, I dissolve 7.5 grams of potassium hydroxide (of technical grade) in water and mix with 107.5 grams of hematite and 30 grams magnesite to form a uniform paste. The hematite is of standard quality, such as is sold under the Eimer & Amend brand. The paste is then dried on a steam bath and thereupon heated in a muffle furnace first for fours hours at from 500° to 525° C., then for two and one-half hours at from 525° to 700° C. and finally for one hour at from 700° to 715° C. The resultant ignited material is then, in dry and comminuted form pressed into tablets in the same manner as above described. In this example also the magnesite forms a carrier for the iron and the potassium residues (or the potassium and manganese residues in case potassium permanganate is employed).

The use of compacted bodies or tablets, such as are produced according to my invention, offers numerous advantages over the granular or briquetted catalysts commonly recommended heretofore for similar purposes. These granular bodies, when employed loose, as stated, oppose a rapidly increasing resistance to the passage of the gases, and soon cease to function as efficient catalysts. On the other hand, where the catalysts have been briquetted by the aid of a binder or in wet condition, the heat prevailing during the catalytic reaction (or in preparatory treatments) will cause the formation of vapors within the mass and in this and in other ways tend to disrupt, distort and break up the catalytic bodies. In contra-distinction thereto, tablets or like compacts produced according to my process and consequently containing no liquid, pasty or destructive vaporable ingredients will suffer no appreciable change during the catalytic reaction. They will not readily crumble or fall apart but are so rigid that the particles maintain their relative spacial positions in the tablet or compact and retain the same after exposure to catalysis gases in the presence of heat for an extended period of time, and should any of the tablets break down, the breaks generally will not destroy the whole tablet and convert it into a powder, but will merely break the tablet into smaller pieces. Even should a certain number of the particles be completely reduced to powder, the relative proportion of such powder in the mass of remaining tablets will not be injurious or destructive to the catalytic process. The greater strength and permanence of the tabletted catalyzer is probably in part due to the fact that the particles, being dry during compression, are, to a certain extent, worked into each other and pressed closely together, forming an autogenous bond between the particles, whereas, when a liquid or pasty substance is present during any molding or compressing operation, the catalyst particles are by such substance more or less definitely spaced apart. The new tabletted catalyzer is also more effective in that it retains its catalytic efficiency for a greater length of time and with a smaller percentage of loss than the products heretofore employed. Naturally a catalyst, which, like the tablet, stands up for a long period of time, will prevent loss due to shutting down of the apparatus for the period of removing more or less frequently the catalyst contained in the converter for purposes of replacement. Moreover, the tabletted catalyst can be transported in ordinary containers, such as barrels, and handled by shovelling or such means without requiring any special precautions to prevent serious injurious disintegration of the tablets and, when for any reason it is desirable to remove the catalyst from the converter, this can similarly be done without serious disintegration and any "fines" which have accumulated in the converter or may result from such handling can be restored to satisfactory catalyst form by simply subjecting them to recompression as in the case of new catalytic material.

The material which is tabletted in accordance with this invention is, as stated, hard and abrasive and prior to this invention it was not known, so far as I am aware, that such material could be tabletted without the aid of a binder within the limits of required porosity in the final mass, nor was it known that even if such material could be compacted into a cohering unit, as the result of pressure and without the aid of a binder, that the compacts would endure as compacts in the high heat and gases of the catalytic retort or converter, nor, even if they did thus stand up, whether they would do so for any length of time, nor was it known whether, in the tabletted and relatively dense form and without the creation of passages due to vaporizing material or otherwise in the tablet, sufficient porosity would be preserved in the compacts to enable them to function properly as catalytic material. The present invention, however, establishes not only that the compacting of the dry, hard, abrasive material is possible, and that the tablets will endure and have sufficient porosity, but also that in addition numerous advantages are developed by the tablet form of catalyst which were not present nor enjoyed by the forms of catalysts heretofore employed. The discoveries upon which the foregoing invention is based may be availed of in any catalytic process which is confronted with more or less similar problems or where the use of a catalyst in the tabletted form may be of advantage.

While I have specified examples in which the catalyst consists of or contains substances which are specifically named, I desire it to be understood that the invention is not restricted to those particular types or varieties of catalytic material, but includes any available catalytic material provided it does not resist tabletting or be so composed as to develop in the tabletted form undesirable or unsatisfactory conditions. Thus, although iron is named in each of the specific examples, catalytic material other than iron may in proper instances, be employed. The reference to material as being "of an iron character" is therefore intended to include any such equivalents.

Wherever, in this specification and in the claims, reference is made to the fact that the compression takes place while the particles are in a dry state, it is, of course, understood that the presence of some moisture (or liquid) is not intended to be excluded so long as such liquid is not active as an agent to impede or counteract the compacting operation hereinabove described or to cause the tablets, when formed, to be disrupted or reduced to non-tablet form as the result of the formation of gas or otherwise. In other words, the autogenous bond which unites the particles that constitute the compact or tablets is so rigid that the particles maintain their relative spacial positions in the product long after any bonds, due to extraneous adhesively functioning agents which may have been associated with the particles initially, as mixture or otherwise, have lost any minor bonding effect such as they may have possessed for a short period of time. I specifically intend to include within the scope of my claims any tablets which retain their tablet form by reason of the principles set forth in the foregoing specification, irrespective of extraneous additions which may be made to the particles prior to the tabletting operation, either during the preparation of the particles themselves (cf. for example substances such as potassium bichromate of Example 1 supra) or by subsequent admixture (as in the case of moist or liquid material such as has been hereinabove referred to). So long as the tablets or compacts in their final form, as used in the catalytic chamber, retain their quality of being porous, compacted, catalytic material, owing retention of the compacted form to the bond produced between small particles of the catalyst material under adequate pressure, they are intended to be included within the scope of my claims since the essence of the invention resides in the tabletted form of the catalyst material, the coherence of said material in said tablets being due, not to binding material or the like, but to the use of dry compression of such character as to cause the compressed particles to cohere by virtue of their autogenous bond and to retain the tabletted shape for extended periods of time, even when exposed to conditions such as ignition, vaporization, or carbonization of non-permanent ingredients and the heat and strain of the catalytic process itself.

Furthermore, I desire to have it understood that, although in each of the three specific examples heretofore mentioned in this specification the ignition is described as preceding the tabletting operation, the invention includes and embraces the tablets when formed of material which is ignited after becoming incorporated in the tablet form. In the latter case there may be a certain evolution of vaporizable matter, but it is not given off in such a manner as to destroy the tablets, but, on the contrary, the tablets seem to grow even harder if dealt with in this manner. The temperatures used in preparing the material for the tabletting operation and the subsequent temperatures made operative upon the tablets may obviously also be varied within wide limits without defeating the objects of this invention.

I claim:

1. A catalyst compact, porous with reference to the gases to be catalyzed, said compact being constituted of hard granules of a non-readily cohering catalyst material substantially free from extraneous adhesive agents, said granules being maintained in fixed relation, by an autogenous bond, characteristic of a pressure induced surface co-action of the granules themselves as distinguished from a union due to extraneous matter, said relation being so fixed that it is maintained during and retained after the compact is exposed to reacting gases in the presence of heat, for an extended period of time.

2. A catalyst compact, suitable for the treatment of gases containing CO, in the step wherein CO in the presence of steam is oxidized to $CO_2$ and is substituted by hydrogen, said compact containing iron oxide of hard, non-readily cohering character and being constituted of granules substantially free from adhesive agents, the said granules being maintained in fixed relation by an autogenous bond characteristic of a pressure induced surface co-action of the granules themselves as distinguished from a union due to extraneous matter, said relation being so fixed that it is maintained during and retained after exposure to catalysis gases in the presence of heat for an extended period of time.

3. A catalyst compact, suitable for the treatment of gases containing CO, in the step wherein CO in the presence of steam is oxidized to $CO_2$ and is substituted by hydrogen, said compact being constituted of granules of a non-readily cohering material comprising a carrier and a substance adapted to catalyze the aforesaid reaction, substantially free from adhesive agents, the said granules being maintained in fixed relation by an autogenous bond characteristic of a pressure induced surface co-action of the granules themselves as distinguished from a union due to extraneous matter, said relation being so fixed that it is maintained during and retained after exposure to catalysis gases in the presence of heat for an extended period of time.

4. A catalyst compact, suitable for the treatment of gases containing CO, in the step wherein CO in the presence of steam is oxidized to $CO_2$ and is substituted by hydrogen, said compact being constituted of granules of a non-readily cohering material comprising a carrier of magnesia and a substance adapted to catalyze the aforesaid reaction, substantially free from adhesive agents, the said granules being maintained in fixed relation by an autogenous bond characteristic of a pressure induced surface co-action of the granules themselves as distinguished from a union due to extraneous matter, said relation being so fixed that it is maintained during and retained after exposure to catalysis gases in the presence of heat for an extended period of time.

5. A catalyst compact, suitable for the treatment of gases containing CO, in the step wherein CO in the presence of steam is oxidized to $CO_2$ and is substituted by hydrogen, said compact being constituted of granules of a non-readily cohering material comprising a carrier, iron oxide adapted to catalyze the aforesaid reaction, and a non-ferrous substance, all non-cohesive and substantially free from adhesive agents, the said granules being maintained in fixed relation by an autogenous bond characteristic of a pressure induced surface co-action of the granules themselves as distinguished from a union due to extraneous matter, said relation being so fixed that it is maintained during and retained after exposure to catalysis gases in the presence of heat for an extended period of time.

6. A catalyst compact, porous with reference to the gases to be catalyzed, said compact being constituted of granules of a non-readily cohering catalyst material substantially free from adhesive agents, the said granules being maintained in fixed relation by an autogenous bond characteristic of a pressure induced surface co-action of the granules themselves as distinguished from a union due to extraneous matter, said relation being so fixed that it is maintained during and retained after exposure to catalysis gases in the presence of heat for an extended period of time, the compact being in the form of tablets of small dimensions.

7. A catalyst compact, porous with reference to the gases to be catalyzed, said compact being constituted of granules of a non-readily cohering catalyst material substantially free from adhesive agents, the said granules being maintained in fixed relation by an autogenous bond characteristic of a pressure induced surface co-action of the granules themselves as distinguished from a union due to extraneous matter, said relation being so fixed that it is maintained during and retained after exposure to catalysis gases in the presence of heat for an extended period of time, the compact being in the form of tablets of small dimensions, each tablet having the shape of an approximately flat body, the larger surfaces of which are slightly convex.

8. The process of preparing material for use in a converter for catalysis which comprises filling a mold with granules of a non-readily cohering catalyst material, and then applying pressure to said material in said mold, insufficient to destroy the porosity of the material, but sufficiently powerful to form a compact in which the granules, as the result of said pressure, are united by an autogenous bond so rigid that the granules maintain their relative positions in the product after discharge from the mold and retain the same, after exposure to catalysis gases in the presence of heat for an extended period of time, long after any bond, due to extraneous agents which were associated with the granules initially, has lost its effect as a bond.

9. The process of preparing material for use in a converter for catalysis which comprises preparing a non-readily cohering material adapted to facilitate the reaction between steam and CO to form hydrogen and $CO_2$, drying the said material, and, while said material is still substantially dry, introducing it into a mold, and compressing the said material into tablets by applying a pressure sufficiently powerful to form a porous compact in which the particles, as the result of said pressure, are united by an autogenous bond so rigid that the particles maintain their relative positions in the product after discharge from the mold and retain the same, after exposure to catalysis gases in the presence of heat for an extended period of time, long after any bond, due to extraneous agents which were associated with the particles initially, has lost its effect as a bond.

10. The process of preparing catalytic compacts for use in converters, which comprises preparing a non-readily cohering catalytic material, drying the said material, and while said material is substantially dry, moulding it into tablets by a pressure sufficiently high to form a porous compact in which the granules, as the result of said pressure, are united by an autogenous bond, but lower than that at which the porosity of the compact required for its catalytic use, is destroyed.

In testimony whereof I have hereunto set my hand.

WILLIAM SCHULTZE.